Sept. 4, 1956

H. W. GOFF 2,761,508

TAPE PERFORATOR

Filed June 22, 1953

5 Sheets-Sheet 1

INVENTOR
H. W. GOFF
BY R. C. Lenz
ATTORNEY

Sept. 4, 1956 H. W. GOFF 2,761,508

TAPE PERFORATOR

Filed June 22, 1953 5 Sheets-Sheet 2

INVENTOR
H. W. GOFF
BY R. C. Perry
ATTORNEY

Sept. 4, 1956 H. W. GOFF 2,761,508

TAPE PERFORATOR

Filed June 22, 1953 5 Sheets-Sheet 3

INVENTOR
H. W. GOFF
BY R. C. Terry
ATTORNEY

Sept. 4, 1956 H. W. GOFF 2,761,508

TAPE PERFORATOR

Filed June 22, 1953 5 Sheets-Sheet 4

INVENTOR
H. W. GOFF
BY R. C. Terry
ATTORNEY

Sept. 4, 1956 H. W. GOFF 2,761,508

TAPE PERFORATOR

Filed June 22, 1953 5 Sheets-Sheet 5

INVENTOR
H. W. GOFF
BY R. C. Perry
ATTORNEY

United States Patent Office 2,761,508

Patented Sept. 4, 1956

2,761,508

TAPE PERFORATOR

Harold W. Goff, Lloyd Harbor, Huntington, N. Y., assignor to Bell Telephone Laboratories, Incorporated, New York, N. Y., a corporation of New York Application June 22, 1953, Serial No. 363,212

20 Claims. (Cl. 164—111)

This invention relates to perforating apparatus and systems, and particularly to apparatus for punching holes in control record cards, strips or webs.

More especially, the invention relates to mechanisms for producing relative movement between punch pins and their cooperating die members whereby to cause perforations to be made in record material disposed between the punches and the die members, and for producing relative movement between the die members and the record material whereby to advance unperforated areas of the record material into position to be perforated.

An object of the invention is to impart to a die member movement having a component in a direction normal to the plane of sheet material disposed between the die member and cooperating punches and also having a component in a direction in or parallel to said plane.

Another object of the invention is to impart movement to perforated record material by imparting to a die member movement having a component directed along the plane of said record material while a cooperating punch member is in penetrative relation to said record material and die member.

Another object of the invention is to subject said die member to movement such that any elemental part or portion thereof describes a closed geometrical figure.

Another object of the invention is to cause stepping or advancing of the control record material only as a consequence of perforation of at least one hole in the control form.

Another object of the invention is to perforate and advance a control record by imparting harmonic motion to the die member of a punch-and-die combination of elements.

The invention features an embodiment in which the movement imparted to the die member for perforating and advancing record material is such that the path described by any elemental part or portion of the die members is substantially elliptical.

The invention also features an embodiment in which the movement imparted to the die member for perforating and advancing the record material is such that the path described by any elemental part or portion of the die member is substantially circular.

The invention also features an embodiment in which the movement imparted to the die member for perforating and advancing the record material in such that the path described by any elemental part or portion of the die member is substantially rectangular.

The several embodiments of the invention to be described in detail hereinafter have a plurality of punch pins disposed in one or more rows for perforating holes in alignments extending transversely of a record card or tape. The punch pins are supported in spaced guide members, one of which is secured to the die block and provides, with the die block, a slot through which the card or web of record material passes. The other guide member is pivotally supported in the frame of the perforating machine to permit arcuate movement of the punch pins in planes extending longitudinally of the record material.

A selectively operable interponent member is provided individual to each punch pin, and these interponent members are movable into or out of blocking relation to the punch pins substantially at the axis of the pivotally mounted punch pin guide. When any interponent member is moved into blocking relation to its punch pin, that pin is blocked against axial movement.

The die block and associated punch pin guide or stripper plate, which cooperatively define the slot through which the record material passes, are supported by arms which are bifurcated to embrace the pivotally mounted punch pin guide member. The die block and its arms form a swingable frame for supporting and guiding the punch pins, and the bifurcations in the arms provide for movement of the die block toward and away from the pivotally mounted guide member.

Mechanisms are provided for imparting to the die block compound movement having a component directed axially of the punch pins and a component arcuately about the axis of the pivotally mounted punch pin guide. As the die block moves toward the ends of the punch pins it brings the web or control form, which is disposed in the slot, into engagement with the ends of all of the punch pins. As movement in that direction continues, the punch pins are moved axially by the web toward the interponents. Those that encounter interponent members in blocking relation have further axial movement arrested and, as the die block continues to move in the same direction, the arrested punch pins perforate the web and enter the die block. The punch pins which do not encounter interponent members in blocking relation continue axial movement under the influence of the tape and sufficient clearance is provided so that the unblocked punch pins will not perforate the tape.

During the movement of the die block toward the punch pins arcuate movement is also being imparted to the die block and, as soon as any of the punch pins penetrate the die block, those pins advance the web by cooperation with the perforations that they have made in the web. After the perforations have been made, the die block recedes, carrying with it the web and, upon disengagement of the punch pins from the die block and web, the advancement of the web ceases. As the die block continues to recede the direction of arcuate movement is reversed and the die block moves along the web toward imperforate portions, the web being held stationary by engagement of a friction member adjacent to the die block. After receding, the die block again approaches the punch pins and these pins are now presented toward imperforate portions of the web by virtue of movement of the pins with the die block relative to the stationary web. The web is again brought into engagement with the punch pins and another set of perforations is made in the web in accordance with a new selective setting of the interponent members. The web is again advanced through the cooperation of the punch pins with the perforations that they have made, and in this way successive sets of perforations are made transversely of the web and uniformly spaced longitudinally thereof as a result of movement of the die block in a path defining a closed geometric figure.

Three different arrangements for imparting movement to the die block are disclosed. In one of these the die block is supported at its opposite ends on spindles disposed in eccentrically bored holes in the hubs of gears. The gears are continuously driven from a power shaft and the axis of the spindles which support the die block describe a circle which provides the components of motion for perforating and advancing the web and for withdrawing the die block and moving it to bring the punch pins into registry with an imperforate segment or zone of the web.

In another arrangement for imparting movement to the die block, that element is mounted on a connecting rod comprising an arm integral with a sleeve which contains an eccentric sleeve secured to the continuously rotating driving shaft. The eccentric sleeve imparts to the die block an elliptical motion which provides the components of movement for perforating and advancing the web.

In accordance with still another embodiment of the invention, the driving shaft is provided with a cam that is engaged by a cam follower mounted on the die block. As the cam rotates the die block is moved alternately toward and away from the punch pins to effect punching of the tape and retraction of the die block, the bifurcations in the previously described die block arms accommodating this movement. Another cam follower engages the cam at a point angularly disposed from the first cam follower, and the second cam follower is mounted on one end of a lever which is pivoted intermediate its ends, the other end of the lever carrying a member which is disposed at the side of the die block, and springs hold an arm associated with the die block in engagement with this member and also hold the first-mentioned cam follower in engagement with the cam. The lever is operable by the cam to impart an arcuate component of movement to the die block for feeding the web and for moving the die block relative to the web to bring the punch pins into registry with imperforate portions of the web. The configuration of the movement imparted to the die block is dependent upon the contour of the cam, and if the cam is a circular disc eccentrically mounted on the driving shaft the motion imparted to the die block will be substantially rectangular.

For a complete understanding of the invention reference may be had to the following detailed description to be interpreted in the light of the accompanying drawings in which.

Figures 1, 2:
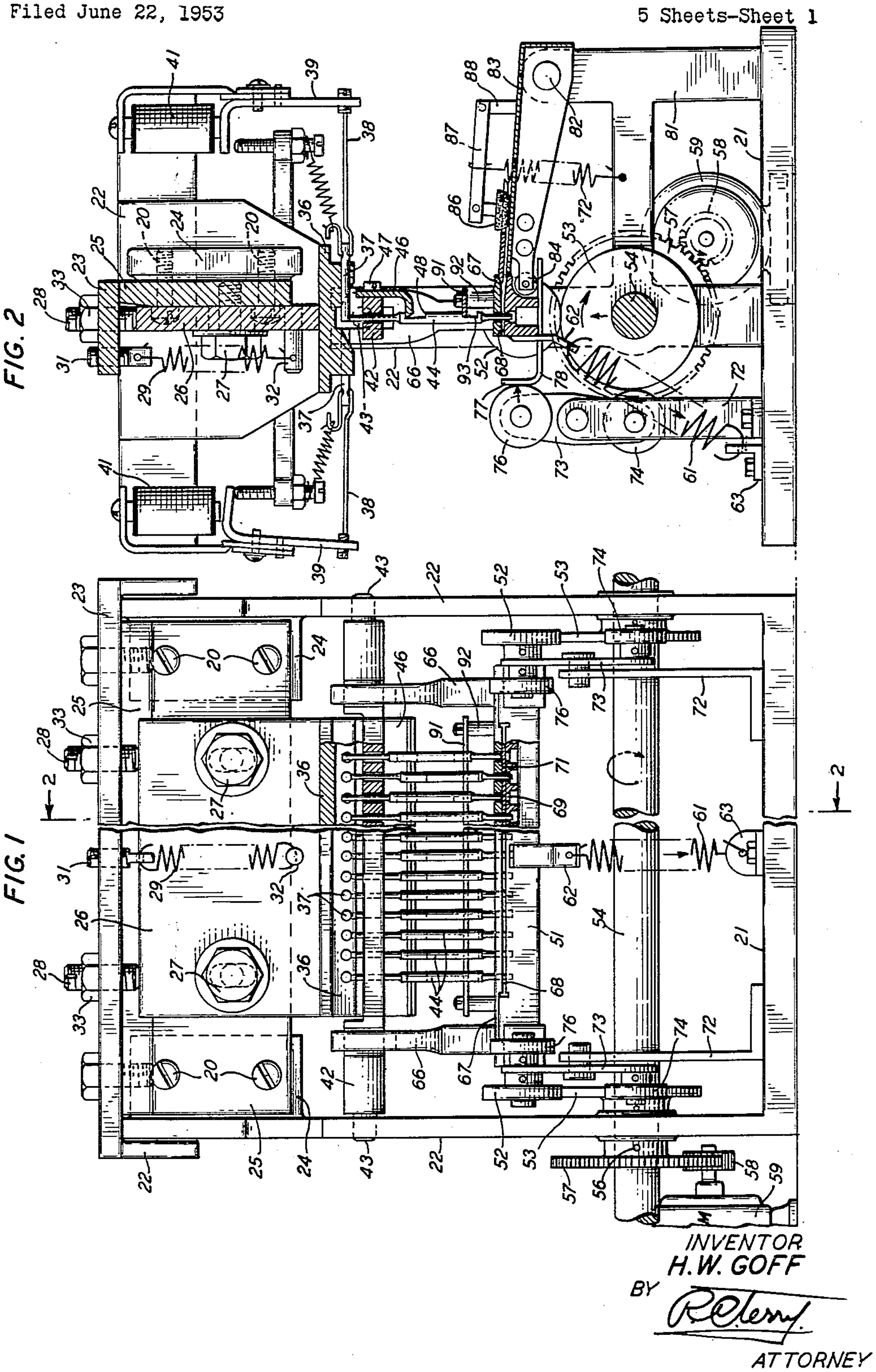
Fig. 1 is an elevational view, partly in section, of a perforating mechanism according to one embodiment of the invention and providing for operation of the die block by a plurality of cam followers to provide substantially rectangular motion of the die block.
Fig. 2 is a vertical sectional view taken on the line 2—2 of Fig. 1.

Referring now to the drawings, and particularly to Figs. 1 and 2, a frame for a perforating mechanism comprises a base 21 with vertically disposed sides 22. The frame is completed by a top member 23 which is parallel to the base.

A bracket 24 is mounted on each of the vertical frame members 22 and a vertically disposed plate 25 is secured to brackets 24 by screws 20. Plate 25 serves as a mounting for a plate 26 which is adjustably clamped to plate 25 by bolts 27 which extend through vertically elongated slots in plate 26 and enter threaded apertures in plate 25. An arrangement for carefully adjusting the position of plate 26 vertically on the perforator is afforded by screws 28 threadedly engaging top frame member 23 and tension spring 29 engaging screw 31 mounted in frame member 23, and spring post 32 secured to plate 26. Screws 28 are provided with lock nuts 33. With lock nuts 33 and bolts 27 loosened, the vertical position of plate 26 may be carefully adjusted by means of screws 28, the spring 29 holding the upper edge of plate 26 in engagement with those screws. After the desired adjustment has been achieved, lock nuts 33 may be tightened and bolts 27 may also be tightened to clamp plate 26 securely to bracket 25.

Plate 26 has secured to its lower edge an interponent guide member 36 which is provided with two rows of apertures for supporting slidable punch interponent pins 37. The interponents of one row are staggered or offset with respect to those of the other row, and each interponent pin 37 is connected by a link 38 to the armature lever 39 of a punch selector magnet 41.

Below the free ends of the punch interponents 37 a punch pin guide 42 is pivotally supported by means of pivots 43 journaled in the frame members 22. Pivoted punch pin guide 42 has its central upper portion cut away to permit the punch interponents to be disposed in proximity to the axis of the punch pin guide. The guide is also provided with a vertical bore in registry with each of the punch pin interponents, and the upper ends of punch pins 44 extend through these bores and are guided thereby for longitudinal movement toward and away from the interponent members. A punch pin retainer bar 46 is secured to punch pin guide 42 by means of screws 47, and each punch pin 44 has an elongated notch or recess 48 in which the free edge of retainer bar 46 is disposed. Bar 46 cooperating with elongated notches 48 permits, and at the same time limits, longitudinal movement of punch pins 44.

Below and spaced from punch pin guide 42 is the cooperating die block 51 which is supported through cam followers 52 rotatably mounted on the die block 51 at its ends by engaging cams 53. Cams 53 are secured to shaft 54 which also has secured thereto, by means of pin 56, a gear 57 meshing with pinion 58 driven by motor 59. Cam followers 52 are maintained in engagement with cams 53 by tension spring 61 having one end connected to die block 51 by means of bracket 62 and the other end connected to base 21 by bracket 63.

Die block 51 has secured thereto upwardly extending arms 66 that are bifurcated at their upper ends to provide spaced arms embracing pivoted punch pin guide 42. Die block 51 also has secured thereto tape stripper plate 67 providing a narrow slot 68 through which passes tape to be perforated by punch pins 44. Stripper plate 67 has apertures for guiding punch pins 44 and die block 51 has apertures 69 to cooperate with the free ends of punch pins 44 for perforating tape 71.

Base 21 of the perforator has secured thereto brackets 72 which pivotally support levers 73. Each of these levers has rotatably mounted at its lower end a cam follower roller 74 engaging the periphery of one of the cams 53 at an angular distance which may be of the order of 90 degrees from the point of engagement of cam follower 52 with the same cam. At its upper end each of the levers 73 supports a disc 76 which engages the upwardly turned flange 77 of a bracket 78 secured to die block 51.

Brackets 81, secured to base 21, pivotally support at 82 a tape guiding platform 83 which is provided with rollers 84 resting on brackets 78 carried by die block 51. A friction pad 86, pivotally supported at the end of lever arm 87 pivoted to bracket 88 carried by tape supporting platform 83, is urged into engagement with tape 71 by spring 72 and, in turn, presses tape 71 firmly against platform 83, thereby urging rollers 84 into engagement with brackets 78. A punch pin retracting bar 91 is mounted on posts 92 carried by stripper plate 67 and retracting bar 91 has an edge disposed in elongated notches 93 of punch pins 44 for downwardly retracting, out of interfering relation with their interponent pins 37, those of the punch pins 44 that were lifted because their interponents were not selected.

Shaft 54, which carries cams 53, is continuously driven. The cam is shown as an eccentric, but it may have any of a variety of contours to provide desired motions to cam followers 52 and 74. As cam 53 rotates die block 51 rises and falls, carrying with it platform 83 by virtue of the cooperation of rollers 84 with brackets 78 carried by the tape guide. Cam 53 also moves cam follower 74 back and forth laterally, thereby rocking lever 73 clockwise and counterclockwise alternately. Discs 76 carried by levers 73 and engaging flange 77 of brackets 78 cause die block 51 to move to and fro, the movement being arcuate about the axis of punch pin guide 42 by virtue of the cooperation with guide 42 of arms 66 secured to die block 51. The slots in arms 66 permit the upward and downward movement of the die block.

Figure 3:
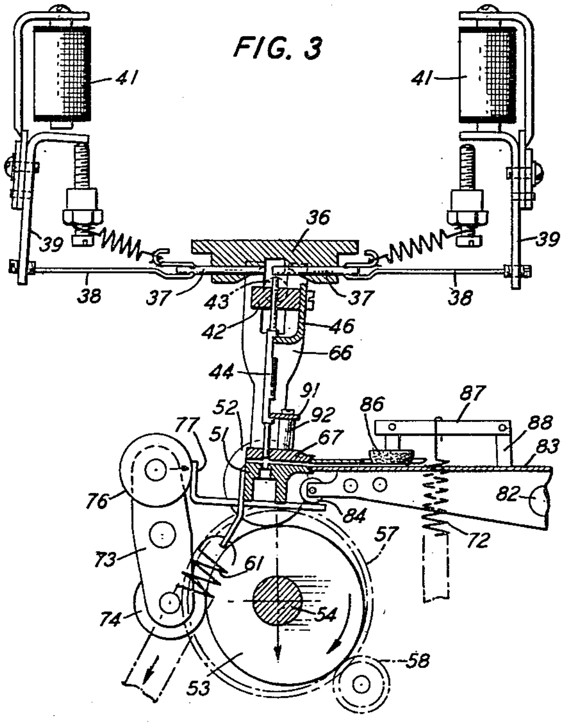
Figs. 3 and 4 are detail views similar to Fig. 2 showing different operating conditions of the perforating mechanism.
Figure 4:
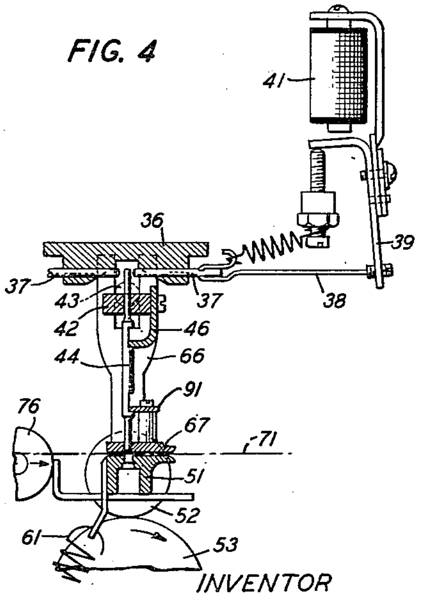

Punch selector magnets 41 are energizable selectively in any desired manner to control the punching of holes in tape 71. The energization of the magnets is coordinated with the rotation of cam 53 so that the magnets shall be operated or released at a time corresponding to that indicated in Fig. 3 in which the die block is at or approaching its lowermost position, and in which the punch pins 44 are retracted from the apertures in die block 51 and also have their upper ends withdrawn from the path of punch pin interponents 37. As indicated in Fig. 3, the levers 73 are at this time at or near their extreme counterclockwise positions under the control of cams 53 so that the die block 51 is at or near its clockwise limit of movement arcuately about the axis of punch pin guide 42. As cam 53 continues to rotate it imparts clockwise movement to levers 73, thereby moving die block 51 counterclockwise or rightwardly as viewed in Figs. 2, 3 and 4. Friction pad 86 holds tape 71 stationary during the rightward or counterclockwise movement of die block 51 so that the die block moves with respect to the tape. During the arcuate movement of die block 51 in counterclockwise direction, the punch selector magnets 41 are energized in accordance with the combination of perforations next to be made in the tape. When the die block is about midway in its arcuate movement rightwardly or counterclockwise cam 53 begins to move the die block upwardly, and substantially at the end of the rightward movement of the die block the slack between the tape disposed between the die block and stripper plate 51, and those of the interponent members 37 that have been moved into blocking relation to their associated punch pins due to energization of the corresponding punch selector magnets 41, has been taken up. Almost immediately after the die block 51 reaches its extreme right-hand position the continued upward movement of the die block causes those of the punch pins that are blocked by their associated interponent members to perforate and penetrate the tape. There is no resistance to continued upward movement of those of the punch pins 44 that are not blocked by interponent members 38, and such punch pins are lifted by the tape, bringing their upper ends above the ends of the corresponding interponent members 38 as shown in Fig. 4. Unblocked punch pins do not perforate the tape.

During the lifting of the unblocked punch pins above the ends of their interponents, the die block 51 is moving arcuately in clockwise direction about the axis of pivot 43 by power supplied by spring 61 and under the permissive control of levers 73 and cam followers 74. Punch pins 44 that have penetrated the tape and die block are thereby effectively coupled to the tape and cause it to be moved leftwardly as viewed in Figs. 2, 3 and 4, friction pad 86 permitting movement of the tape.

About the time that the die block 51 reaches its extreme leftward or clockwise position it has been drawn clear of the punch pins 44 that had penetrated the tape and the die block, the retainer bar 46 preventing or restricting downward movement of the punch pins. Retainer bar 46 and retracting bar 91 cooperate with punch pins 44 to disengage the pins from the die block 51 and to clear the operating paths of punch pin interponents 37. As the die block is again moved rightwardly by lever 73 friction pad 86 again holds the tape stationary and the die block moves with respect thereto to present the lower ends of punch pins 44 in registry with an imperforate zone of the tape in preparation for the punching of the next combination of holes.

The cycle above described is repeated each time one or more of the punch selector magnets are energized, the tape being perforated in accordance with the combination of magnets energized and being advanced by virtue of the cooperative engagement of the punch pins with the perforations in the tape, the punch pins then being disengaged and the die block moved relative to the tape to bring the punch pins into position to punch another set of perforations. As previously stated cam 53 is continuously driven, and in the event that none of the punch selector magnets is energized in the interval allotted to that operation all of the punch pins, upon being brought into engagement with the tape, will be lifted by the tape, their upper ends being lifted above the ends of the punch interponent pins, and the lower ends of the punch pins merely resting against the surface of the tape. With no perforations thus made in the tape, the mere frictional engagement of the lower ends of the punch pins with the surface of the tape as the die block is moved arcuately to the left will be insufficient to overcome the frictional engagement of friction pad 86 with the tape and the tape will not be advanced, but the die block will merely move leftwardly relative to the tape and, upon reaching the limit of its leftward movement, will again move rightwardly to present the pins in registry with the same imperforate zone of the tape. In this way tape is advanced only when at least one punch pin pierces and cooperatively engages the tape, and the continuous rotation of cams 53 does not cause any advancement of the tape during intervals in which punch selector magnets 41 are idle and unoperated.

Using an eccentric as the cam 53, and with the cam followers occupying substantially the angular positions relative to the cam shown in Figs. 2, 3 and 4, the motion imparted to die block 51 will be substantially square, having reference to the path described by any elemental part or portion of the die block. The square will have its diagonals disposed substantially in horizontal and vertical planes, since the die block is substantially intermediate the extremes of its vertical positions at the extremes of its arcuate travel and is substantially at extremes of its vertical travel when it is substantially midway of its arcuate travel. By changing the relative lengths of the two arms of levers 73, the geometric figure described by any elemental portion of die block 51 may be changed from a square to a rectangle providing unequal vertical and arcuate movements of the die block 51. Also, by changing the contour of cam 53 complex motions may be imparted to the die block, but such motions would still result in the describing of closed geometrical paths by the die block. For example, the cam may be contoured to provide for upward movement of the die block to effect punching, with little or no accompanying lateral movement of the block, followed by lateral movement of the die block to advance the web, in turn followed by lowering of the die block to disengage the die members, with ensuing lateral movement of the die block in the opposite direction to complete the closed geometrical path. If desired movements of the die block cannot be obtained using a single cam to operate cam followers 52 and 74, separate cams contoured to impart the desired motions may be employed.

Figs. 5 to 9, inclusive, show an arrangement for imparting substantially elliptical movement to the die block. The arrangement for supporting the punch selector magnets and the punch interponent members is substantially identical to that shown in Figs. 1 to 4 and will not be described again. The side members 22 of the perforator frame have secured thereto brackets 101 which pivotally support a punch pin guide 102. This guide is similar to the one previously described and has secured thereto the punch pin retainer bar 103. Die block 104, to which is secured punch pin stripper plate 106 is secured to arms 107 that are bifurcated at their upper ends, as in the case of the arms 66, to provide arms embracing pivoted punch pin guide 102. A variation in the punch pin arrangement, by comparison with the arrangement shown in Figs. 1 to 4, inclusive, is shown in Figs. 5 to 9, inclusive, in that there is a double row of punch pins disposed transversely of the tape and the pins of one row are off-set or staggered with respect to those of the other row. Upwardly extending arms 107 of the tape guide have secured thereto punch pin retracting bar 108 which cooperates with the same elongated notches in the punch as punch pin retainer bar 103. The edges of punch pin retaining and retracting bars 103 and 108, respectively, are notched to provide for cooperation with the pins in both rows.

The continuously driven shaft 111 for driving the die block is supported in bearing members 112. Between the arms 22 of the frame of the perforator, shaft 111 supports a sleeve 113 which has a cylindrical periphery and an eccentrically located cylindrical bore by which the sleeve is mounted on shaft 111. Sleeve 113 rotationally fits in a connecting rod 114, the free end of which is rigidly secured to die block 104. Sleeve 113 is snugly fitted or is keyed to shaft 111 to rotate therewith. Accordingly, the eccentric sleeve 113 rotates within the cylindrical bore of connecting rod 114 and moves the axis of the bore of connecting rod 114 in a circular path. Connecting rod 114 in turn imparts movement to die block 104 in a geometrical pattern or figure which is substantially elliptical. This type of geometrical figure results from the fact that the vertical component of movement of the die block is substantially equal to the diameter of the circle described by the axis of connecting rod 114, but the horizontal component is shorter than the diameter of the circle described by the axis of the connecting rod because the die block is disposed between the axis of the connecting rod and the axis of interponent guide 102 about which the die block 104 moves as permitted by its supporting arms 107. The motion of the unitary structure comprising connecting rod 114, die block 104 and its supporting arms 107 is that of a pendulum which alternately shortens and lengthens as it is swung to and fro by eccentric sleeve 113. Die block 104 will have associated with it a tape supporting platform similar to the platform 83 in Figs. 1 to 4, and the platform will in turn be provided with a friction pad similar to pad 86. In order to avoid needless repetition in the drawings, these elements have not been shown in Figs. 5 to 9, inclusive.

It should also be understood that the tape supporting platform may be mounted on either side of the die block depending upon the direction of rotation of shaft 111. With the direction of rotation of the shaft indicated by the arrow in Figs. 6 to 9, inclusive, the tape guiding platform would be located at the left.

Figure 6:
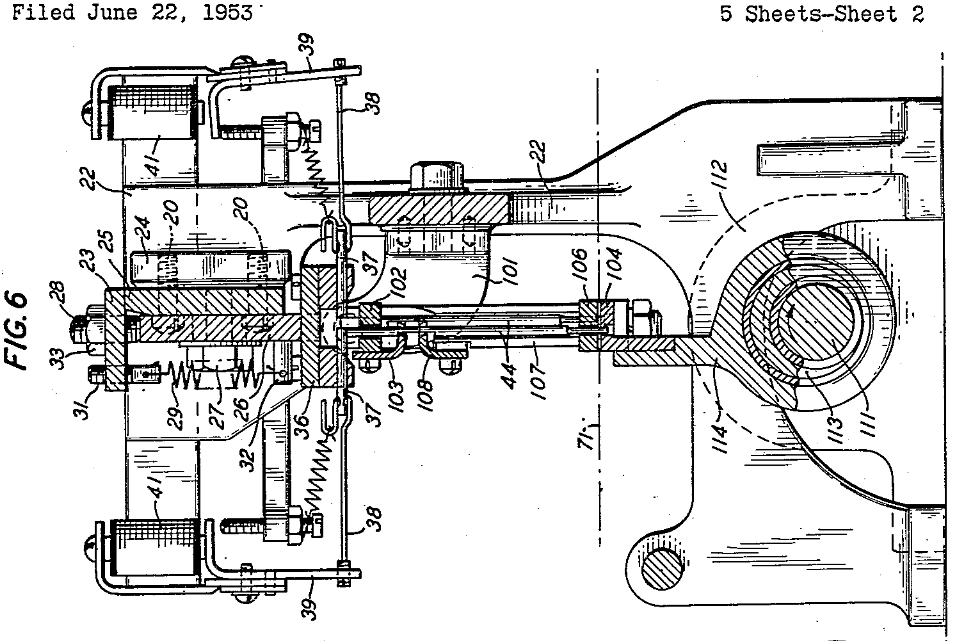
Fig. 6 is a vertical sectional view taken on the line 6—6 of Fig. 5.
Figure 5:
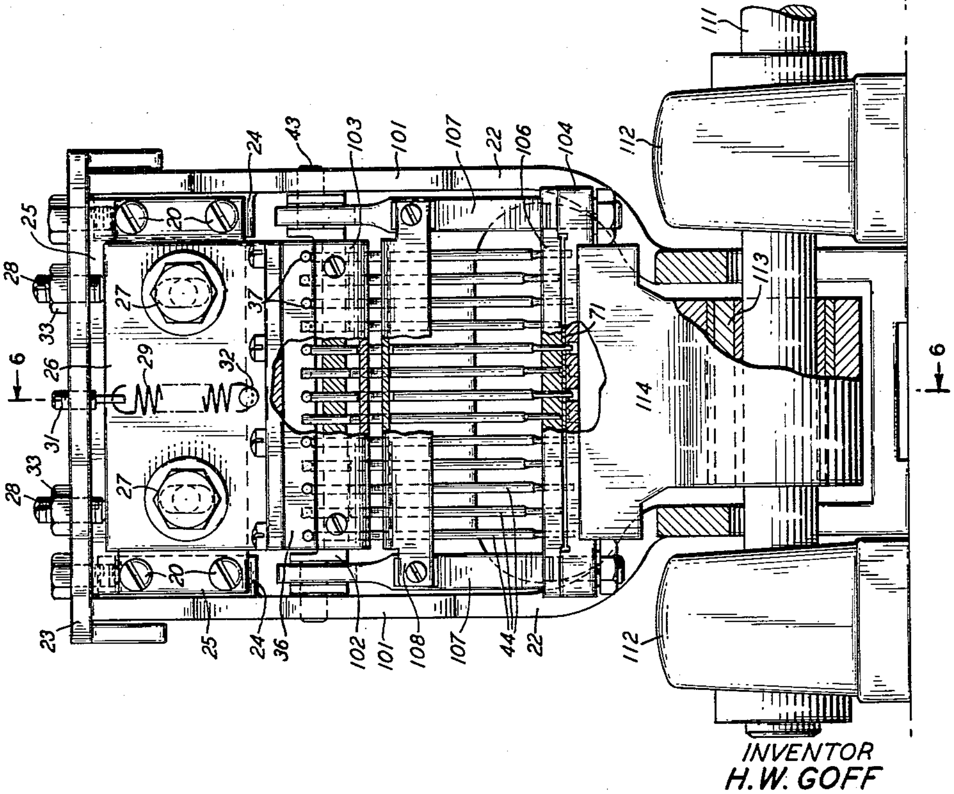
Fig. 5 is an elevational view, partly in section, of a perforating mechanism having its die block carried by a connecting rod driven by an eccentric to impart substantially elliptical motion to the die block.
Figures 7, 8, 9:
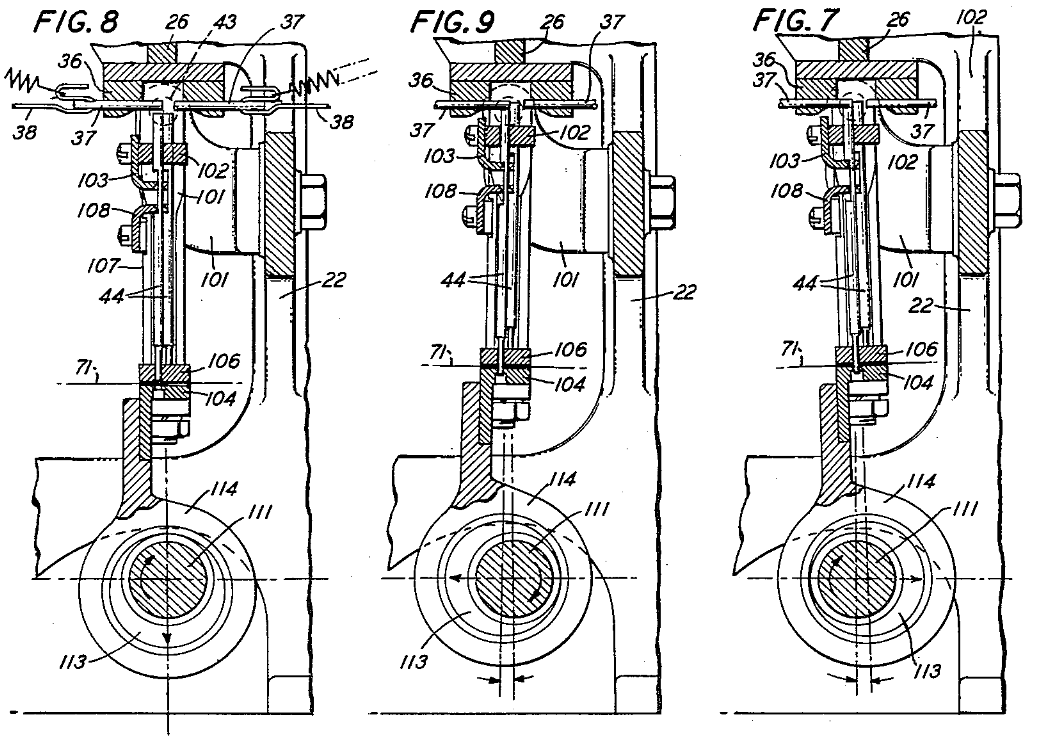
Figs. 7, 8 and 9 are detail views similar, in part, to Fig. 6, and showing various different operating conditions of the perforating mechanism.

The instantaneous condition of the apparatus indicated in Fig. 6 is that the die block 104 is in its extreme upper position of vertical travel and is being moved rightwardly and is intermediate the extremes of its horizontal component of movement. In Fig. 7 the eccentric sleeve 114 has rotated 90 degrees from the condition shown in Fig. 6 and has brought the die block to its extreme rightward or counterclockwise position, having moved the tape rightwardly through the coupling with the tape afforded by the operated punch pins. In the condition shown in Fig. 8 the eccentric sleeve 113 has rotated an additional 90 degrees and the die block is at the lowermost position of its vertical travel and is midway of its leftward or clockwise travel. In the condition shown in Fig. 9, the eccentric sleeve 113 has rotated another 90 degrees, the die block 104 has reached the limit of its leftward or clockwise movement and has moved upwardly substantially one-half the distance of its vertical travel. During the leftward or clockwise movement of the die block 104, it moves relative to the tape which is held stationary by the friction pad (not shown) and upon perforating the tape shortly before eccentric sleeve 113 reaches the instantaneous condition indicated in Fig. 8 the die block advances the tape by means of the punch pins that have penetrated the tape, the friction pad permitting this movement. As in the case of the previously described embodiment of the invention, shaft 111 rotates continuously and when none of the punch selector magnets 41 is operated die block 104 moves to and fro with respect to the tape, but does not advance the tape because all of the punch pins are lifted by the tape as the die block moves upwardly and do not penetrate the tape nor the die block.

Figure 10:
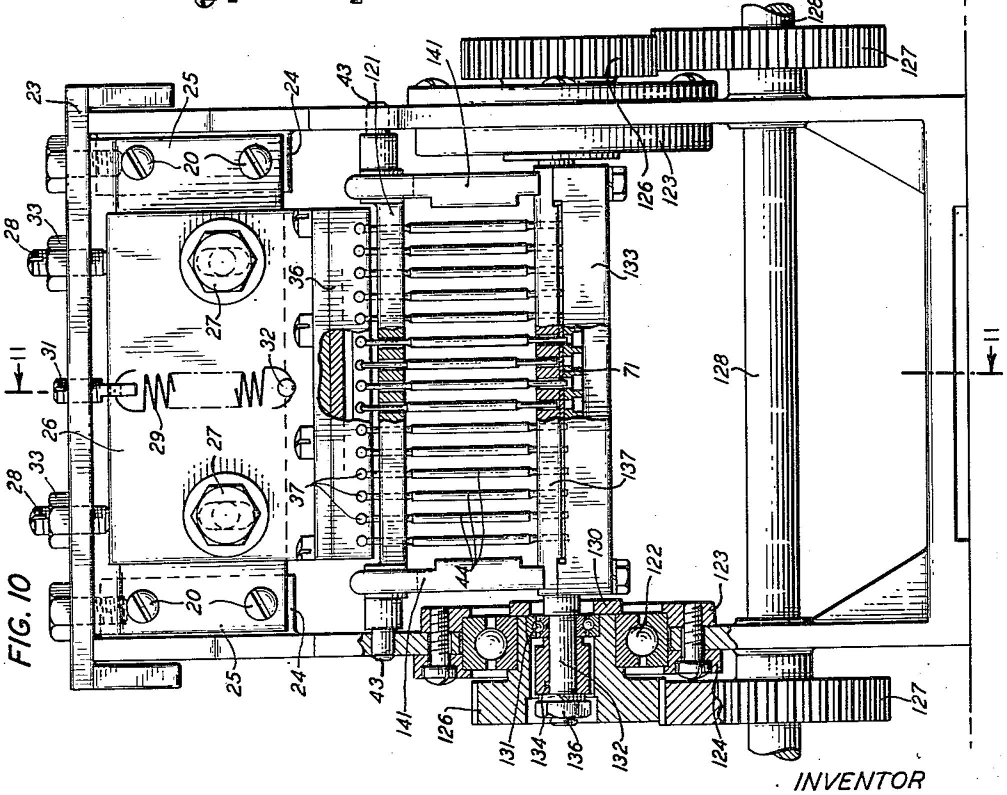
Fig. 10 is an elevational view, partly in section, of a perforating mechanism having the die block carried by spindles supported in eccentric bores of continuously driven gears for imparting circular motion to the die block.
Figure 12:
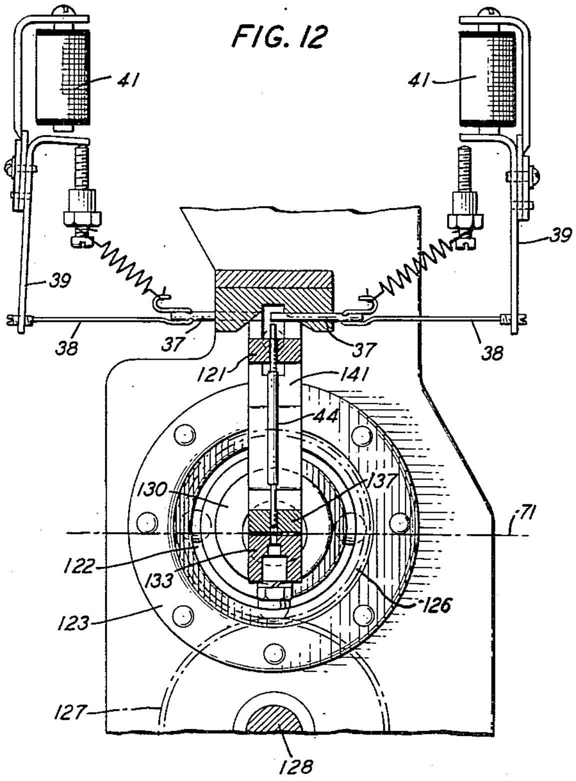
Figs. 12 and 13 are detail views similar to Fig. 11 showing various operating conditions of the perforating mechanism.

Figs. 10 to 13, inclusive, show still another embodiment of a record form perforator, and in this embodiment the movement imparted to the die block is substantially circular. The arrangement for supporting the punch pin selector magnets and the punch pin interponent members is substantially identical to that shown in Figs. 1 to 4, and as in the case of the embodiment shown in Figs. 5 to 9, inclusive, the description will not be repeated. The side members 22 of the perforator frame pivotally support a punch pin guide 121 in the same manner that punch pin guide 42 in Figs. 1 and 2 is supported. Each of the side members 22 of the frame of the perforator mechanism supports, in a circular aperture therein, an antifriction bearing assembly 122 that is held in place in the frame member 22 by inner and outer retainer rings 123 and 124, respectively. Retaining rings 123 and 124 hold the outer ring of the antifriction bearing assembly stationary and the inner ring thereof is free to rotate. The inner ring of antifriction bearing assembly 122 receives and supports the hub of a gear 126 that meshes with gear 127 secured to continuously rotatable driving shaft 128. As indicated in Fig. 10 identical antifriction bearing structures for supporting a gear 126 is associated with each of the frame members 22.

The hub of each of the gears 126 is provided with a cylindrical bore eccentrically disposed with respect to the hub. Into this bore is fitted an antifriction bearing assembly 131 that is held in place by retainer ring 130. The inner ring of the antifriction bearing assembly 131 receives a spindle 132 secured to die block 133. A spacer sleeve 134 fitted over spindle 132 is forced into engagement with the inner ring of antifriction bearing assembly 131 by a retaining nut 136 threadedly engaging the end portion of spindle 132, thereby locking the inner ring of the bearing assembly 131 to the spindle. As previously stated, it will be understood that the die block 133 is provided with spindles at both ends and that there are identical structures within the hubs of the gears 126 for supporting the spindles.

Die block 133 has associated with it stripper plate 137 provided with cylindrical holes for guiding punch pins 44 and also has secured thereto at its opposite ends upwardly extending arms 141, the upper ends of which are bifurcated to provide arms embracing pivoted punch pin guide 121.

Figure 11:
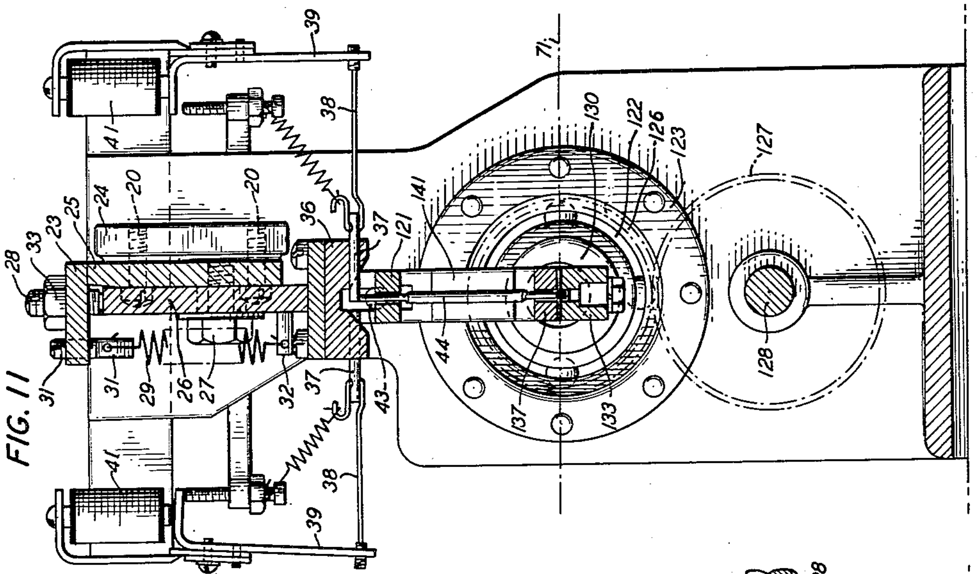
Fig. 11 is a vertical sectional view taken on the line 11—11 of Fig. 10.
Figure 13:
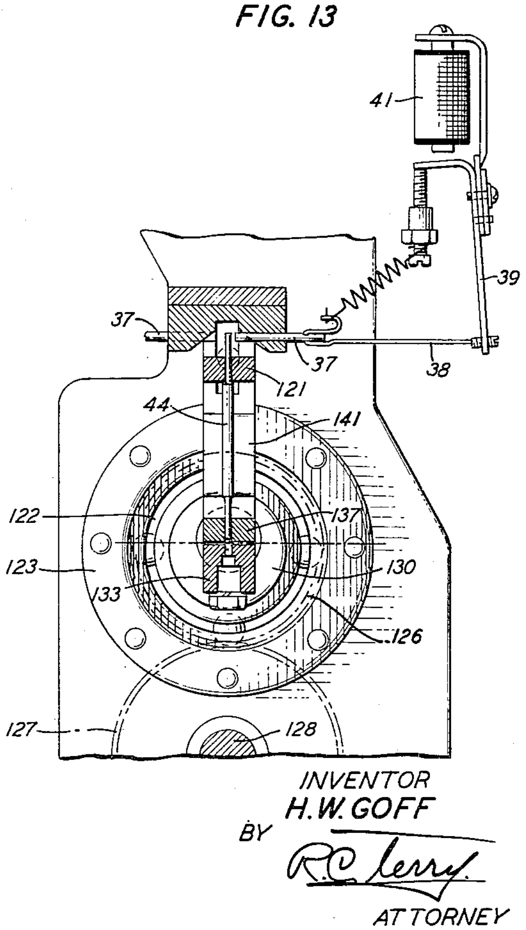

As the gears 126 are rotated continuously by shaft 128, the axis of spindles 132 supporting die block 133 is carried in a circle having at its center the axis of rotation of the gears 126. It follows from this that die block 133 is carried in a circle, viewed from the end as in Figs. 11, 12 and 13. In its lowermost position (Fig. 12) the die block is drawn clear of the lower ends of the punch pins, and the pins are in turn drawn clear of the interponent members so that the punch selector magnets may be operated in combinations to provide for the selective punching of holes in the tape. When the die block is in its uppermost position, as shown in Fig. 13, those punch pins that have not been blocked by interponent members will be lifted by the tape so that their ends rise above or into the path of their associated interponent members without perforating the tape. When the punch pins, upon being lifted by the die block, encounter operated interponent members as in Fig. 11, the upward movement of these punch pins is arrested and continued upward movement of the die block results in penetration of the tape by the punch pins as indicated in Fig. 11.

It will be understood that the perforator shown in Figs. 10 to 13, inclusive, will be provided with a tape guiding platform similar to the platform 83 in Fig. 2, and with a friction pad for preventing movement of the tape when the die block travels through that portion of its circular path in which the punch pins are disengaged from the tape. The friction pad will, of course, permit movement of the tape when the die block is traversing that portion of its circular path in which one or more of the punch pins have penetrated the tape. It will also be understood that during any intervals in which none of the punch selector magnets is operated the die block will move to and fro about the axis of punch pin guide 121 without imparting movement to the tape, the punch pins being lifted and lowered by the tape due to the vertical component of movement of the die block without penetrating the tape.

Although specific embodiments of the invention have been shown in the drawings and described in the foregoing specification, it will be understood that the invention is not limited to those embodiments but is capable of modification, rearrangement and substitution of parts and elements without departing from the spirit of the invention.

What is claimed is:

1. In a web perforating mechanism, a die member, means for disposing a normally stationary web in perforation receiving relation to said die member, a punch member, selectively operable interponent means for said punch member, and a driver for imparting movement to said die member in a path defining a closed geometrical figure and including a component directed longitudinally of said punch member to cause movement of said web into engagement with said punch member and perforation of said web by continued movement thereof under the condition of arrestment of said punch member by said interponent means, and also including a component directed longitudinally of said web to cause advancement of said web solely by penetrative engagement of said punch member with said web and moving die member.

2. In a web perforating mechanism, a swingably mounted frame comprising a pivotally mounted punch guide, a spaced die member and bifurcated side arms embracing said guide and interconnecting said guide and member, means for disposing a web in perforation receiving relation to said die member, a plurality of punch members slidably mounted in said frame, interponent members selectively presentable in blocking registry with said punch members, a continuously driven shaft, a driving cam on said shaft, linkage means operable by and cooperating with said driving cam for imparting to said die member movement in a path comprising a closed geometrical figure and including a component accommodated by the bifurcations in said arms and causing punch members blocked by selected interponent members to penetrate said web and die member.

3. In a web perforating mechanism, a swingably mounted frame comprising a pivotally mounted punch guide, a spaced die member and bifurcated side arms embracing said guide and interconnecting said guide and member, means for disposing a web in perforation receiving relation to said die member, a plurality of punch members slidably mounted in said frame, interponent members selectively presentable in blocking registry with said punch members, a continuously driven shaft, and a driving interconnection between said shaft and said die member for imparting to said die member movement in a path comprising a closed geometrical figure and including a component accommodated by the bifurcations in said arms and causing punch pins blocked by selected interponent members to penetrate said web and die member, and also including a component accommodated by the pivotal mounting of said guide and causing advancement of said web by penetrative engagement of any punch member therewith.

4. In a web perforating mechanism, a swingably mounted frame comprising a pivotally mounted punch guide, a pair of bifurcated arms embracing said guide, and a second punch guide secured to said arms at the ends thereof remote from the first-mentioned guide, a plurality of punch members slidably supported in said guides, an interponent member selectively presentable in blocking relation to each of said punch members, a die member secured to said second guide member in spaced relation thereto to define a slot for passage of a web, a continuously driven shaft, a driving cam on said shaft, and linkage means operable by and cooperating with said driving cam for imparting to said die member movement in a path comprising a closed geometrical figure and including two components accommodated by the bifurcations in said arms, one for causing said web to be punched and said die member to be penetrated by punch members having their interponent members presented in blocking relation and the other for causing advancement of said web by penetrative engagement of any of said punch members with its respective interponent member.

5. In a web perforating mechanism, a swingably mounted frame comprising a pivotally mounted punch guide, a pair of bifurcated arms embracing said guide, and a second punch guide secured to said arms at the ends thereof remote from the first-mentioned guide, a plurality of punch members slidably supported in said guides, an interponent member selectively presentable in blocking relation to each of said punch members, a die member secured to said second guide member in spaced relation thereto to define a slot for passage of a web, a continuously driven shaft, and a driving interconnection between said shaft and said die member for imparting to said die member movement including a component accommodated by the bifurcations in said arms for causing said web to be punched and said die member to be penetrated by punch members having their interponent members presented in blocking relation, and also including a component accommodated by the pivotal mounting of said frame for advancing said web by penetrative coupling of one or more punch members therewith.

6. In a web perforating mechanism, a swingably mounted frame comprising a pivotally mounted punch guide, a pair of bifurcated arms embracing said guide, and a second punch guide secured to said arms at the ends thereof remote from the first-mentioned guide, a plurality of punch members slidably supported in said guides, an interponent member selectively presentable in blocking relation to each of said punch members, a die member secured to said second guide member in spaced relation thereto to define a slot for passage of a web, a continuously driven shaft, and a driving interconnection between said shaft and said die member for imparting to said die member movement including a component accommodated by the bifurcations in said arms for causing said web to be punched and said die member to be penetrated by punch members having their interponent members presented in blocking relation, and also including a component accommodated by the pivotal mounting of said frame for advancing said web by penetrative coupling of one or more punch members therewith, and a member in frictional engagement with said web for inhibiting longitudinal movement thereof except that due to penetrative coupling of punch members.

7. In a web perforating mechanism, a continuously driven shaft, a cam secured to said shaft, a die member, a revolvable roller carried by said die member and engaging said cam to thereby support and impart movement to said die member, a punch guide plate secured to said die member in spaced relation thereto to define a web-receiving slot, a pivotally mounted punch guide at a distance from and parallel to said die member, a plurality of punch members slidably supported near the opposite ends thereof by said guides, arms secured to said die member and having bifurcations embracing said pivotally mounted punch guide, means subjecting said die member to control by said cam additional to that applied through said roller for imparting movement to said die member in a path comprising a closed geometrical figure, and an interponent member selectively presentable in blocking relation to each punch member for causing its punch member to produce a perforation in a web disposed in said slot and advancement of said web in response to the movement imparted to said die block by said cam.

8. In a web perforating mechanism, a plurality of punch members, a pivotally mounted guide member for supporting said punch members for endwise movement individually and for angular movement in unison about the axis of pivotal mounting of said guide member, selectively effectual blocking members for limiting endwise movement of said punch members, a die member having apertures to be penetrated by said punch members, a continuously driven cam, a cam follower carried by said die member and engaging said cam to cause movement to be imparted to said die member toward and longitudinally of said punch members, a lever having an element engaging said die member from a direction approximately normal to a radius of said cam passing through the point of engagement of said cam follower with said cam, and a cam follower carried by said lever and engaging said cam for imparting to-and-fro movement to said die member, accompanied by angular movement of said punch members in predetermined synchronism with the movement of said die member by said first-mentioned cam.

9. In a web perforating mechanism, a plurality of punch members, a pivotally mounted guide member for supporting said punch members for endwise movement individually and for angular movement in unison about the axis of pivotal mounting of said guide member, selectively effectual blocking members for limiting endwise movement of said punch members, a die member having apertures to be penetrated by said punch members, a continuously driven cam, a cam follower carried by said die member and engaging said cam to cause movement to be imparted to said die member toward and longitudinally of said punch members, a lever having an element engaging said die member from a direction approximately normal to a radius of said cam passing through the point of engagement of said cam follower with said cam, and a cam follower carried by said lever and engaging said cam for imparting to-and-fro movement to said die member accompanied by angular movement of said punch members in predetermined synchronism with the movement of said die member by said first-mentioned cam, said cam, cam followers and lever having geometrical relations such that said die member describes a rectangular path of movement.

10. In a web perforating mechanism, a die member, means for disposing a web in perforation receiving relation to said die member, a punch member, selectively operable interponent means for said punch member, a driver for imparting movement to said die member in a path defining a closed geometrical figure comprising a quadrilateral having one diagonal disposed substantially longitudinally of said punch member to cause movement of said web into engagement with said punch member and perforation of said web by continued movement thereof under the condition of arrestment of said punch member by said interponent means, and said figure having the other diagonal disposed substantially longitudinally of said web to cause advancement of said web by penetrative engagement of said punch member with said web.

11. In a web perforating mechanism, a die member, means for disposing a normally stationary web in perforation receiving relation to said die member, a punch member, selectively operable interponent means for said punch member, a driver for imparting movement to said die member in a path defining a closed geometrical figure comprising an ellipse having its major axis disposed substantially longitudinally of said punch member to cause movement of said web into engagement with said punch member and perforation of said web by continued movement thereof under the condition of arrestment of said punch member by said interponent means, and said figure having its minor axis disposed substantially longitudinally of said web to cause advancement of said web solely by penetrative engagement of said punch member with said web and moving die member.

12. In a web perforating mechanism, a die member, means for disposing a normally stationary web in perforation receiving relation to said die member, a punch member, selectively operable interponent means for said punch member, a driver for imparting movement to said die member in a path defining a closed geometrical figure comprising an ellipse having one of its axes disposed substantially longitudinally of said punch member to cause movement of said web into engagement with said punch member and perforation of said web by continued movement thereof under the condition of arrestment of said punch member by said interponent means, and said figure having its other axis disposed substantially longitudinally of said web to cause advancement of said web solely by penetrative engagement of said punch member with said web and moving die member.

13. In a web perforating mechanism, a die member, means for disposing a normally stationary web in perforation receiving relation to said die member, a punch member, selectively operable interponent means for said punch member, a driver for imparting movement to said die member in a path defining a closed geometrical figure comprising a circle affording a component of movement along a diameter disposed substantially longitudinally of said punch member to cause movement of said web into engagement with said punch member and perforation of said web by continued movement thereof under the condition of arrestment of said punch member by said interponent means, and said figure affording another component of movement along a diameter of said circle disposed substantially longitudinally of said web to cause advancement of said web solely by penetrative engagement of said punch member with said web and moving die member.

14. A perforating mechanism according to claim 1 in which said driver comprises a continuously driven shaft, a disc eccentrically mounted on said shaft and rotatable therewith, and a connecting rod comprising a portion rotatably enclosing said disc and an arm connected to said die member.

15. A perforating mechanism according to claim 1 in which said driver comprises a continuously rotating shaft having an off-set portion, and a connecting rod comprising a portion engaging said off-set shaft portion and an arm connected to said die member.

16. A perforating mechanism according to claim 3 in which said driving interconnection comprises a crank-like part of said shaft and a rigid connecting rod comprising a portion engaging said crank-like part of the shaft and an arm fixedly secured to said die member to impart to said frame movement of displacement laterally and longitudinally.

17. A perforating mechanism according to claim 1 in which said driver comprises a continuously rotatable member and a support for said die member engaging said rotatable member eccentrically thereof.

18. A perforating mechanism according to claim 1 in which said driver comprises a continuously rotatable member having an eccentrically disposed cylindrical bore parallel to its axis, and a spindle carried by said die member and received into said bore to cause said die member to be moved through a path comprising a circle.

19. A perforating mechanism according to claim 1 in which said driver comprises a continuously rotatable member, a crankpin engaging said continuously rotatable member, and a direct connection between said crankpin and said die member to cause said die member to be moved through a path comprising a circle.

20. A perforating mechanism according to claim 3 in which said driving interconnection comprises a member continuously driven by said shaft and a spindle carried by said die member and connected to said continuously driven member eccentrically thereof to impart to said frame movement of displacement laterally and longitudinally.

References Cited in the file of this patent

UNITED STATES PATENTS

| | | |
|---|---|---|
| 829,932 | Pollak | Aug. 28, 1906 |
| 944,790 | De Kleist | Dec. 28, 1909 |
| 1,067,047 | Marchthal | July 8, 1913 |
| 2,136,210 | Hall | Nov. 8, 1938 |
| 2,202,889 | Bates | June 4, 1940 |
| 2,394,534 | Conner | Feb. 12, 1946 |
| 2,544,527 | Crosland | Mar. 6, 1951 |